US008355749B2

(12) United States Patent
Hong et al.

(10) Patent No.: US 8,355,749 B2
(45) Date of Patent: Jan. 15, 2013

(54) DUAL MODE TERMINAL, BASE STATION, AND CONTENT CONTROLLER, AND CONTENT TRANSMISSION METHOD THEREOF, AND TERMINAL CRADLE

(75) Inventors: Seung Eun Hong, Dajeon (KR); Woo Yong Lee, Dajeon (KR)

(73) Assignee: Electronics and Telcommunications Research Institute, Daejeon (KR)

( * ) Notice: Subject to any disclaimer, the term of this patent is extended or adjusted under 35 U.S.C. 154(b) by 238 days.

(21) Appl. No.: 12/823,800

(22) Filed: Jun. 25, 2010

(65) Prior Publication Data

US 2010/0330899 A1 Dec. 30, 2010

(30) Foreign Application Priority Data

Jun. 25, 2009 (KR) ........................ 10-2009-0056810
Nov. 30, 2009 (KR) ........................ 10-2009-0116692

(51) Int. Cl.
*H04M 1/00* (2006.01)

(52) U.S. Cl. ................. 455/552.1; 455/553.1; 455/41.2; 379/219

(58) Field of Classification Search ............... 455/552.1, 455/553.1, 41.2; 379/219
See application file for complete search history.

(56) References Cited

U.S. PATENT DOCUMENTS 6,314,082 B1 11/2001 Malmgren
8,086,264 B2 * 12/2011 Desai ......................... 455/552.1

FOREIGN PATENT DOCUMENTS

KR 2006-0066021 A 6/2006
KR 2008-0047478 A 5/2008

* cited by examiner

*Primary Examiner* — Sanh Phu
(74) *Attorney, Agent, or Firm* — Rabin & Berdo, P.C.

(57) ABSTRACT

Provided are a dual mode terminal, a base station, and a content controller, and a content transmission method thereof, and a terminal cradle. A cellular module of the dual mode terminal may receive a content from the base station through a cellular communication. A signal processor may release a compression of the received content and output the content. A short-range communication module may transmit the output content to a short-range terminal using a wideband.

6 Claims, 13 Drawing Sheets

DUAL MODE TERMINAL, BASE STATION, AND CONTENT CONTROLLER, AND CONTENT TRANSMISSION METHOD THEREOF, AND TERMINAL CRADLE

CROSS-REFERENCE TO RELATED APPLICATIONS

This application claims the benefit of Korean Patent Application No. 10-2009-0056810, filed on Jun. 25, 2009, and Korean Patent Application No. 10-2009-0116692, filed on Nov. 30, 2009, in the Korean Intellectual Property Office, the disclosures of which are incorporated herein by reference.

BACKGROUND

1. Field of the Invention

The present invention relates to a dual mode terminal, a base station, and a content controller, and a content transmission method thereof, and a terminal cradle, and more particularly, to a dual mode terminal, a base station, and a content controller that may provide a content service using a cellular communication and a short-range communication, a content transmission method thereof, and a terminal cradle.

2. Description of the Related Art

Currently, with development of technology, a mobile communication terminal may provide a multimedia service as well as a voice call. The multimedia service may provide various types of broadcasting receive functions. The broadcasting receive functions may receive, for example, a satellite Digital Multimedia Broadcasting (DMB) and a terrestrial DMB. In the case of the satellite DMB and the terrestrial DMB, a viewer may unilaterally receive a broadcasting provided from a broadcasting provider.

Generally, all the broadcasting contents may be transferred to a terminal used by a user, for example, a mobile communication terminal, and a set-top box even, without a request from the user. The terminal may display only a broadcasting content selected by the user. However, in the above scheme, an important network resource may be ineffectively used. In particular, when a service is provided via a cellular radio frequency, a number of contents supported may be significantly limited due to a limited wireless resource.

Also, when a content is serviced in a unicast form only through a user request, the same content may repeatedly occupy a radio frequency resource and thus a network resource may be ineffectively used. Also, in a conventional art, when the multimedia content is used through a mobile communication terminal, a quality of service (QoS) satisfactory to a user may not be provided due to a limited display size of the mobile communication terminal.

SUMMARY

An aspect of the present invention provides a dual mode terminal, a base station, and a content controller that may effectively service a broadcasting content to a cellular wireless network resource, and may quickly transmit the content using a wideband frequency, a content transmission method thereof, and a terminal cradle, Another aspect of the present invention also provides a dual mode terminal that may decompress a compressed multimedia content and wirelessly transmit the decompressed multimedia content via a short-range radio module.

According to an aspect of the present invention, there is provided a dual mode terminal, including: a cellular module to receive a content from a base station through a cellular communication; a signal processor to release compression of the received content, and to output the content; and a short-range communication module to transmit the output content to a short-range terminal using a wideband.

The short-range communication module may include: a radio frequency (RF) unit including a plurality of power amplifiers and a plurality of low noise amplifiers; and a scalable wireless control unit to determine a frequency band, a number of power amplifiers, and a number of low noise amplifiers to be used for a communication with the short-range terminal by adaptively changing a channel bandwidth of the wideband.

The scalable wireless control unit may change the channel bandwidth and determines the number of power amplifiers and the number of low noise amplifiers based on a data rate and a power.

The dual mode terminal may further include a cradle interface unit to provide interfacing with a cradle including an extensible RF module and an extensible power, the extensible RF module including a plurality of power amplifiers and a plurality of low noise amplifiers. The short-range communication module may perform beamforming using the extensible RF module of the cradle, and may receive a fixed power from the extensible power.

According to another aspect of the present invention, there is provided a terminal cradle, including: a cradle interface unit being mounted with a dual mode terminal; an extensible RF module to perform beamforming using a plurality of power amplifiers and a plurality of low noise amplifiers; and an extensible power supplier including an extensible power to be supplied to the dual mode terminal using a battery or a fixed power.

The terminal cradle may further include a communication module to provide, to the dual mode terminal, a content received over a wired and wireless network. The dual mode terminal may store the received content.

The terminal cradle may further include a communication module to transmit a content, stored in the dual mode terminal, to a short-range terminal communicable with the dual mode terminal.

According to still another aspect of the present invention, there is provided a base station for transmitting a content, including: a cellular module to service a content provided from an external controller, to terminals located within a cell through a cellular communication; and an agent to select a reliable transmission scheme for transmitting the provided content to all the terminals located within the cell when the provided content corresponds to a broadcasting content having at least one of a relatively high popularity and a relatively high importance, and to adaptively select a transmission scheme based on a channel state of each of the terminals when the provided content does not correspond to the broadcasting content.

The agent may assign a priority to each of transmission schemes for transmitting the provided content, and may transmit the broadcasting content having a relatively high popularity and importance according to a transmission scheme having a relatively high priority.

The base station may further include a table storage unit to store a table containing a signal-to-noise ratio (SNR) and a resource amount required for each modulation and coding scheme (MCS). When the provided content corresponds to the broadcasting content, the agent may select an MCS having a low order modulation and a low coding rate to transmit the provided content.

The agent may allocate a number of contents to be transmitted according to a broadcasting scheme, a number of contents to be transmitted according to a switch broadcasting scheme, and a number of contents to be transmitted according to a switch multicast scheme, based on a priority ranking of the provided content. A total number of the contents may correspond to a total number of contents transmittable by the agent.

According to yet another aspect of the present invention, there is provided a content controller, including: a content manager to classify contents received from a content server, into a broadcasting content to be transmitted to all the terminals located within a cell, and a non-broadcasting content; and a content recognition communication unit to transmit the classified broadcasting content to all the base stations, and to transmit the non-broadcasting content to a base station requesting a content transmission among the base stations.

The content manager may select the broadcasting content based on a popularity and an importance.

The base stations may transmit the received broadcasting content according to a most reliable transmission scheme, and may transmit the non-broadcasting content based on a state of each of the terminals.

According to a further another aspect of the present invention, there is provided a content transmission method of a dual mode terminal, the method including: receiving a content from a base station through a cellular communication; releasing compression of the received content; and transmitting the decompressed content to a short-range terminal using a wideband.

The transmitting may include determining a number of power amplifiers and a number of low noise amplifiers used in an RF module and changing a channel bandwidth of the wideband based on a data rate and a power.

According to still another aspect of the present invention, there is provided a content transmission method of a base station, the method including: receiving a content from an external controller; transmitting the received content to all the terminals located within a cell according to a reliable transmission scheme when the received content corresponds to a broadcasting content having at least one of a relatively high priority and a relatively high importance; and adaptively transmitting the received content to the terminals through a cellular communication based on a channel state of each of the terminals when the received content is received from the external controller in response to a request from one of the terminals and does not correspond to the broadcasting content.

The broadcasting content may be transmitted to all the terminals according to an MCS having a low order modulation and a low coding rate among a plurality of transmission schemes. When the received content does not correspond to the broadcasting content, the received content may be selectively transmitted based on the channel state of each of the terminals.

According to still another aspect of the present invention, there is provided a content transmission method of a content controller, the method including: classifying contents received from a content server, into a broadcasting content to be transmitted to all the terminals located within a cell, and a non-broadcasting content; and transmitting the classified broadcasting content to all the base stations, and transmitting the non-broadcasting content to a base station requesting a content transmission among the base stations.

The classifying may include classifying the contents into the broadcasting content and the non-broadcasting content based on a popularity and an importance.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
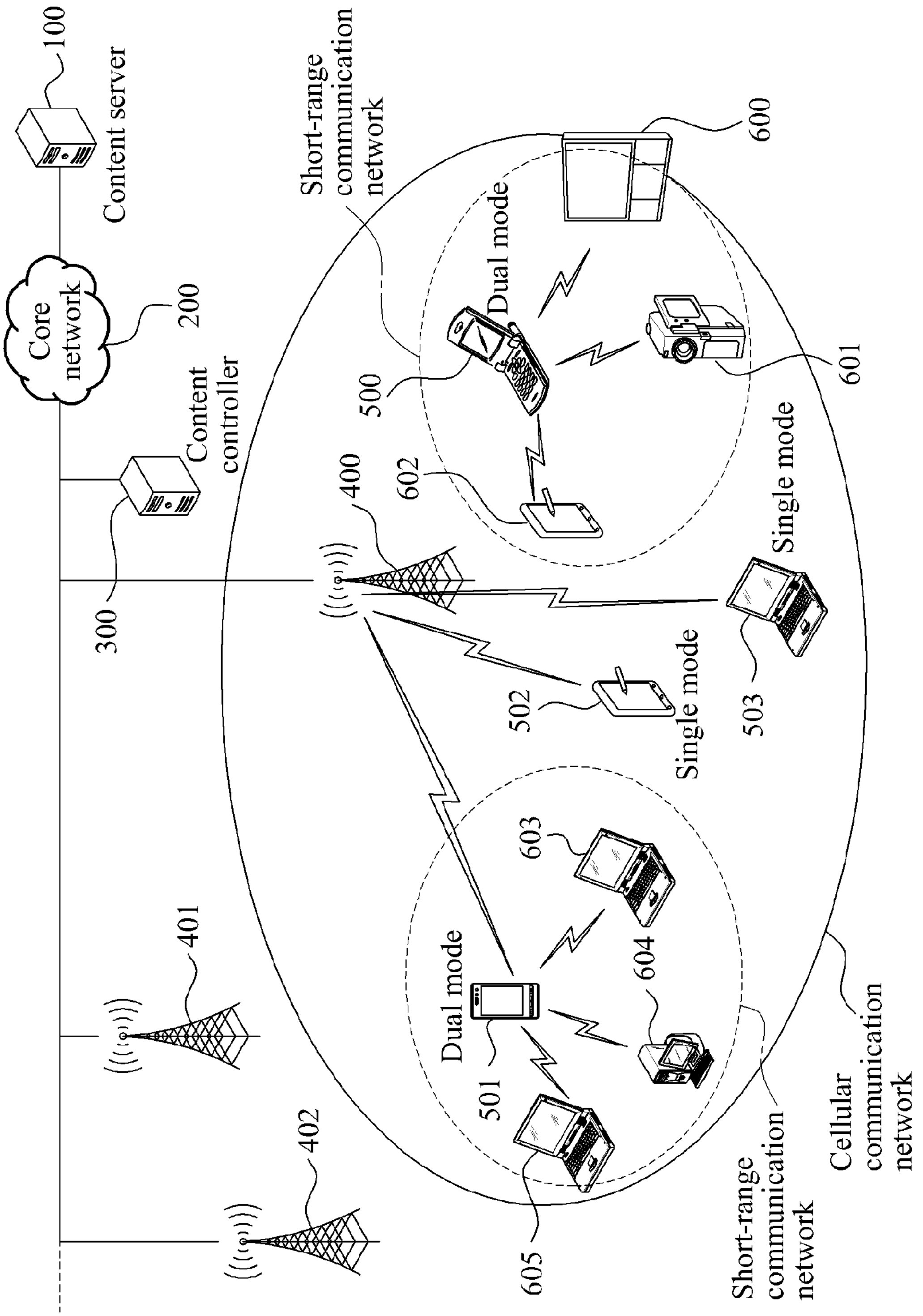
FIG. 1 is a diagram illustrating a wireless switched digital multimedia system combining a cellular communication and an ultra speed short-range communication according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

FIG. 1 is a diagram illustrating a wireless switched digital multimedia system combining a cellular communication and an ultra speed short-range communication according to an embodiment of the present invention.

A cellular wireless network may enable terminals 500, 501, 502, and 503 located within an area having a radius of maximum few km to wirelessly access a core network 200.

Base stations 400, 401, and 402 may connect the terminals 500, 501, 502, and 503 to the core network 200.

The cellular wireless network may locate the plurality of base stations 400, 401, and 402 for each area to provide services to the terminals 500, 501, 502, and 503 that are distributed over a relatively wide area. Various types of schemes may be applicable to the cellular wireless network according to a frequency and communication scheme of wirelessly connecting the base stations 400, 401, and 402 with the terminals 500, 501, 502, and 503. The cellular wireless network may include, for example, a Worldwide Interoperability for Microwave Access (WiMAX) scheme, a Long Term Evolution (LTE) scheme, a 3G/4G mobile communication scheme, and the like, and may include a system using a frequency that is unused due to a digital conversion of a terrestrial TV service, that is, using a white space or a ultra speed wireless local area network (LAN) system. Accordingly, technology of providing an Internet Protocol Television (IPTV) service to a cellular mobile communication system is introduced.

Currently, as a broadcasting scheme of a terrestrial broadcasting is being switched from an analog scheme to a digital scheme, a frequency used for the analog terrestrial broadcasting is used no longer. The above frequency is referred to as the white space. According to an embodiment of the present invention, a cellular wireless service may also be provided using the white space.

Also, it is possible to provide a multimedia service to a mobile communication terminal using the cellular wireless network of FIG. 1. For this, the terminals 500 and 501 may include a cellular communication module and an ultra speed short-range communication module to thereby wirelessly communicate with apparatuses located within a short-range (hereinafter, referred to as a "short-range terminal") 600, 601, 602, 603, 604, and 605.

The ultra speed short-range communication module may be, for example, a transmitting/receiving apparatus using a frequency band of 60 GHz or an ultra wideband (UWB) wireless transmitting/receiving apparatus. Although the transmitting/receiving apparatus using 60 GHz is used as an example herein, it is only an example and thus the present invention is not limited thereto.

Hereinafter, a terminal installed with the cellular communication module and the ultra speed short-range communication module is referred to as a dual mode terminal. A terminal installed with the cellular communication module is referred to as a single mode terminal. In FIG. 1, the terminals 500 and 501 may correspond to the dual mode terminals and thus also be referred to as the dual mode terminals 500 and 501, and the terminals 502 and 503 may correspond to the signal mode terminals and thus may also be referred to as the single mode terminals 502 and 503. The dual mode terminals 500 and 501 may relay a cellular communication service to the short-range terminals 600, 601, 602, 603, 604, and 605. Also, hereinafter, a terminal providing a multimedia communication service, for example, an IPTV service among cellular communication services is referred to as a Wireless Switched Digital Video (WSDV) client terminal. The WSDV client terminal according to an embodiment of the present invention may correspond to the single mode terminal or the dual mode terminal.

According to an embodiment of the present invention, there may be provided a method that may effectively provide a multimedia service, particularly, an IPTV service among cellular communication services to a short-range terminal using a single mode terminal and a dual mode terminal.

A content controller 300 may selectively distribute, to the base stations 400, 401, and 402, all the multimedia contents provided from a content server 100. The content controller 300 may also be referred to as a WSDV controller. In the content distribution, the content controller 300 may distribute, based on a popularity of a corresponding content and an importance thereof assigned by a provider, the multimedia contents into a content to be provided to all the base stations 400, 401, and 402, and into a content to be selectively provided to each of the base stations 400, 401, and 402 when a request is received from respective corresponding base stations 400, 401, and 402. Hereinafter, descriptions will be made based on the base station 400.

The base station 400 may service a content received from the content controller 300, based on a wireless network resource. The base station 400 may transmit a content having a relatively high popularity and importance according to a most reliable transmission scheme so that all the terminals 500, 501, 502, and 503 located within the cell may receive the corresponding content, and may transmit a content excluding the above content according to a most optimal scheme based on a channel state of each terminal and a content popularity. It will be described later with reference to Table 1. Due to a low order modulation and a high coding rate, the most reliable transmission scheme may use a relatively high wireless resource compared to other transmission schemes. The low order modulation may be more robust against a radio error compared to a high order modulation, and the high wireless resource may use many time slots.

Figure 2:
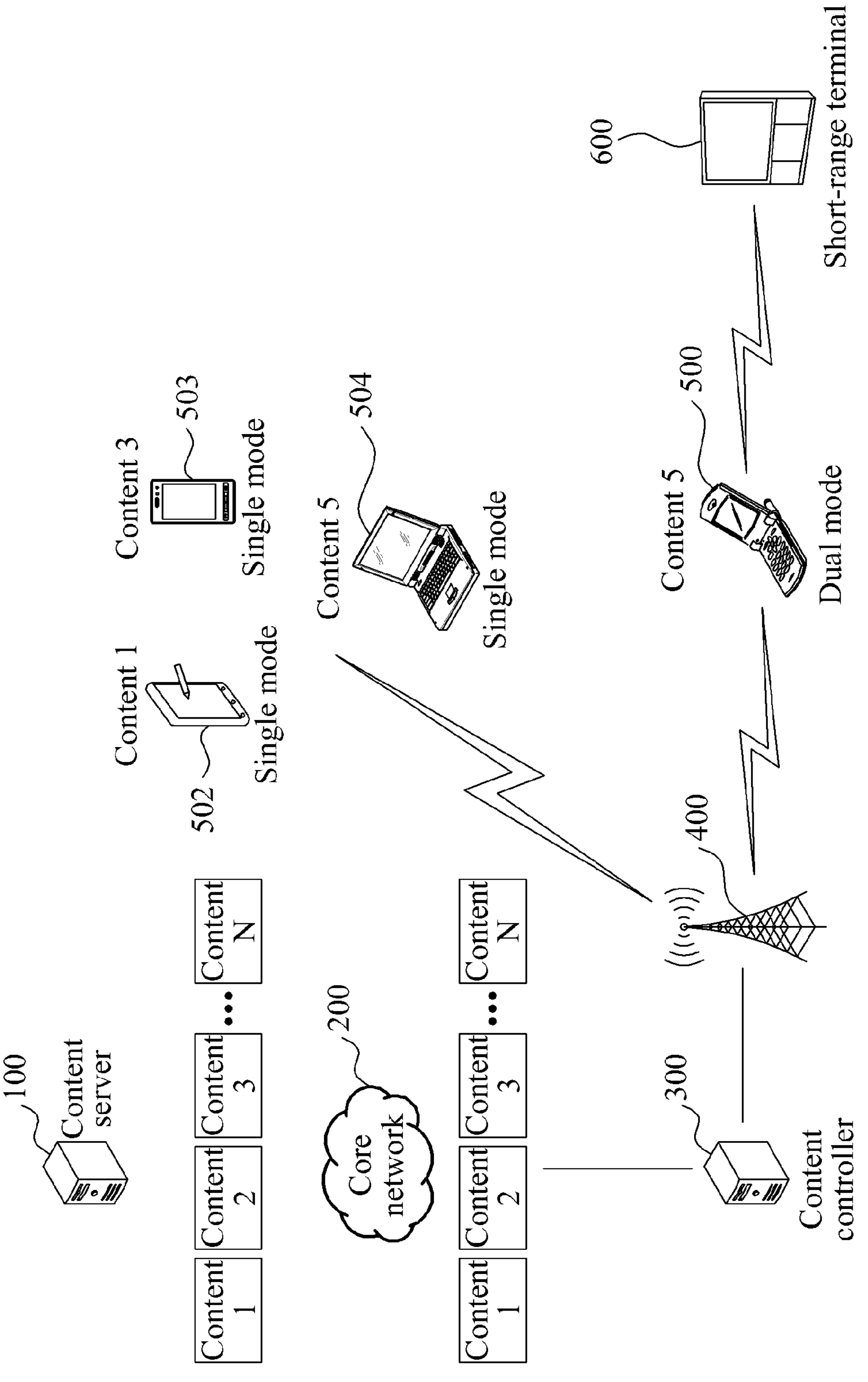
FIG. 2 is a diagram illustrating a wireless switched digital multimedia system according to an embodiment of the present invention.

FIG. 2 is a diagram illustrating a wireless switched digital multimedia system according to an embodiment of the present invention.

Referring to FIG. 2, four terminals 500, 502, 503, and 504 may receive a WSDV service from a single base station 400. In this instance, the terminals 502, 503, and 504 corresponding to single mode terminals are being serviced with contents 1, 3, and 5, respectively. The terminal 500 corresponding to a dual mode terminal are being serviced with the content 5. The contents 1, 3, and 5 may be included in a total of N contents provided form a content server 100.

Each of the terminals 500, 502, 503, and 504 may request the base station 400 for its own content using a cellular communication. The base station 400 may request a content controller 300 for the corresponding content. In response to the request from the base station 400, the content controller 300 may select a content received from a content server 100 and may transmit the selected content to the base station 400.

In FIG. 2, the content controller 300 may transmit the contents 1, 3, and 5 to the base station 400. The base station 400 may service the received contents 1, 3, and 5 to the respective terminals 500, 502, 503, and 504 using a cellular wireless resource. In this instance, the base station 400 may service contents by effectively employing wireless network resources. Specifically, the base station 400 may transmit a content by employing an optimal transmission scheme with respect to a channel state of each terminal and thus may use a most effective transmission scheme for a content transmission.

The content 5 requested by the single mode terminal 504 and the dual mode terminal 500 may be transmitted by occupying respective corresponding wireless resources in a unicast form in order to be serviced immediately after the request is received, however, may also be serviced by occupying a single wireless resource in a broadcast form or a multicast form. In particular, it may be highly probable that a popular content may be received by a plurality of terminals and thus the base station 400 may transmit the popular content to all the terminals 500, 502, 503, and 504 within the cell according to a most reliable transmission scheme so that the terminals

500, 502, 503, and 504 may receive the popular content. For example, the most reliable transmission scheme may use the broadcast form or the multicast form occupying the single wireless resource, and may also use an MCS having a smallest index number in Table 1.

A content provided through the cellular communication may be generally provided in a compressed form, and may also be provided only to a service subscriber and be provided using an encoding scheme in order to limit a content distribution. Accordingly, the content may be decompressed and be decoded in the terminals 500, 502, 503, and 504. A sequence of performing decompression and decoding may vary depending on a compression and encoding procedure.

According to an embodiment of the present invention, a dual mode terminal may decode and decompress a received content and wirelessly transfer the content to a short-range terminal according to a short-range communication scheme. An example of the short-range terminal may include a display device installed with a UWB short-range communication module.

In this instance, a protection of a content may be initially performed. The UWB short-range communication may be, for example, a wireless communication using a 60 GHz communication module. In general, the 60 GHz communication module may provide a transmission rate of a maximum few gigabps level and thus may transmit the content to the short-range terminal in a non-compressed form, which makes it possible to provide a high quality image.

Figure 3:
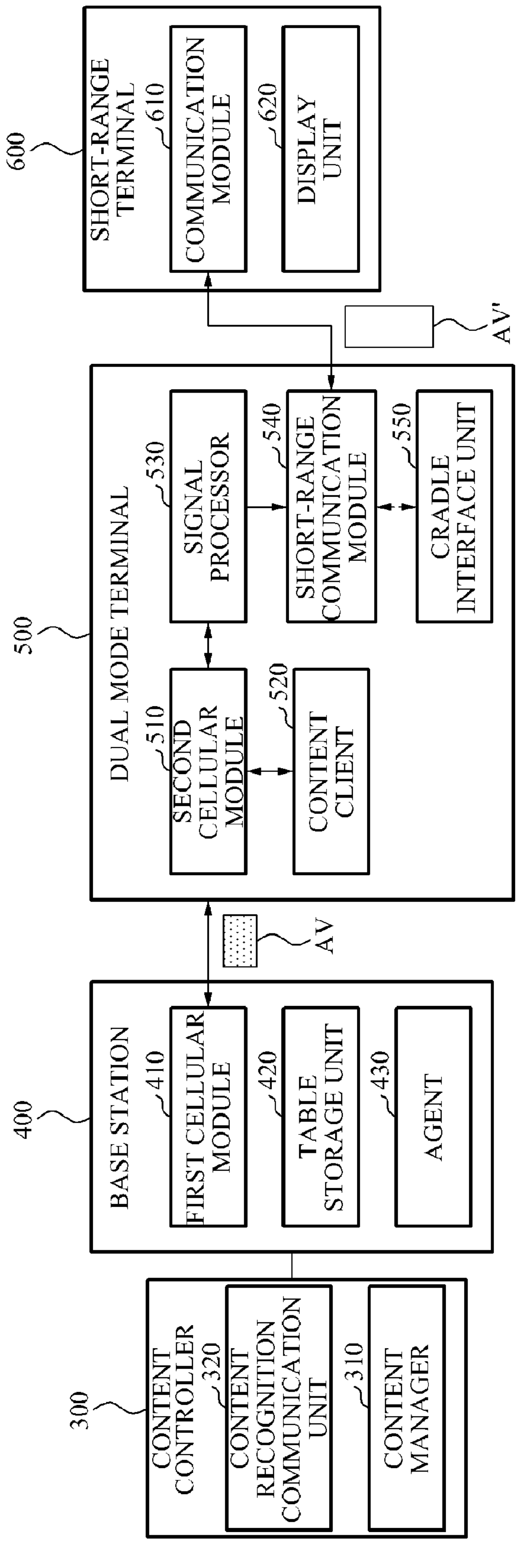
FIG. 3 is a block diagram illustrating a content controller, a base station, a dual mode terminal, and a short-range terminal of FIG. 2.

FIG. 3 is a block diagram illustrating the content controller 300, the base station 400, the terminal 500 (hereinafter, the dual mode terminal 500), and the short-range terminal 600 of FIG. 2.

Referring to FIG. 3, the content controller 300 may include a content manager 310 and a content recognition communication unit 320. The content manager 310 may classify contents received from the content server 100, into a broadcasting content to be transmitted to all the base stations, and a non-broadcasting content. Here, the non-broadcasting content indicates a content excluding the broadcasting content. The content manager 310 may select the broadcasting content based on various criteria. In the present embodiment, the content manager 310 may sort the received contents based on a popularity and an importance, and may select a content having a relatively high popularity and importance as the broadcasting content. A number of contents having the relatively high popularity may be determined by a network operator. The network operator corresponds to an operator of a wireless network including the content controller 300 and the base stations 400, 401, and 402. The wireless network may include, for example, a WiMAX network, a 3G network, and the like. Also, the content manager 310 may make a content ranking list.

The content recognition communication unit 320 may receive the contents from the content server 100, and may transmit the content ranking list and the broadcasting content to all the base stations 400, 401, and 402. Also, the content recognition communication unit 320 may store a content that is not classified into the broadcasting content. When a base station, for example, the base station 400 requests a content, the content recognition communication unit 320 may transmit a requested content to the base station 400. Specifically, the content manager 310 may select, from contents received from the content server 100, a content corresponding to content information received from the base station 400. The content recognition communication unit 320 may transmit the selected content to the base station 400.

The base station 400 may transmit the received broadcasting content to all the terminals 500, 502, 503, and 504 within the cell according to a most reliable transmission scheme. Also, the base station 400 may transmit a non-broadcasting content only to a terminal requesting a content transmission, or may also transmit the non-broadcasting content to all the terminals 500, 502, 503, and 504 according to an optimal transmission scheme. For this, the base station 400 may include a first cellular module 410, a table storage unit 420, and an agent 430.

The first cellular module 410 may communicate with the content controller 300, employed as an external controller, and the terminals 500, 502, 503, and 504 within the cell according to a cellular communication scheme. The first cellular module 410 may service, to the terminals 500, 502, 503, and 504 within the cell, the content provided from the content controller 300 through a cellular communication.

Specifically, the content controller 300 may transmit the broadcasting content to all the base stations 400, 401, and 402 and thus the first cellular module 410 may transmit the received broadcasting content to all the terminals 500, 502, 503, and 504 within the cell.

When a terminal, for example, the terminal 500 located within the cell requests a content using the cellular communication, the first cellular module 410 may request the content controller 300 for transmission of the content and then receive the corresponding content. The first cellular module 410 may transmit the corresponding content to the terminal 500 using a transmission scheme selected by the agent 430. In this instance, when the corresponding content has a relatively high popularity and importance, the content may also be transmitted to the other terminals 502, 503, and 504.

The table storage unit 420 may store a table containing a signal transmission distance, a signal-to-noise ratio (SNR), and a resource amount required for each modulation and coding scheme (MCS). The agent 430 may select a content transmission scheme by referring to the stored table. The table may be expressed by Table 1.

TABLE 1

| Index | MCS | #bits per PUSC slot | SNR Required (dB) | Distance (m) |
|---|---|---|---|---|
| 0 | QPSK (CTC) ½ Rep6 | 48 | $SNR_0 = -2.56$ | $d_0 = 1815$ |
| 1 | QPSK (CTC) ½ Rep4 | 48 | $SNR_1 = -0.83$ | $d_1^{d1d1} = 1632$ |
| 2 | QPSK (CTC) ½ Rep2 | 48 | $SNR_2 = 1.55$ | $d_2 = 1411$ |
| 3 | QPSK (CTC) ½ Rep1 | 48 | $SNR_3 = 5.01$ | $d_3 = 1142$ |
| 4 | 16QAM (CTC) ½ | 96 | $SNR_4 = 10.13$ | $d_4 = 834$ |
| 5 | 64QAM (CTC) ½ | 144 | $SNR_5 = 15.15$ | $d_5 = 614$ |
| 6 | 64QAM (CTC) ⅔ | 192 | $SNR_6 = 19.16$ | $d_6 = 480$ |
| 7 | 64QAM (CTC) ¾ | 216 | $SNR_7 = 21.57$ | $d_7 = 414$ |
| 8 | 64QAM (CTC) ⅚ | 240 | $SNR_8 = 25.73$ | $d_8 = 321$ |

Referring to Table 1, in a WiMAX network, the table may include the resource amount, the SNR, and the signal transmission distance, which are required for each MCS. The resource amount required for each MCS may be indicated as a number of bits that may be transmittable per a fixed slot unit defined in a Partial Usage of Subchannel (PUSC) mode of a WiMAX protocol, that is, #bits per PUSC slot. Information as shown in Table 1 may be defined to be similar or alike with respect to all the cellular networks including the WiMAX network.

Also, in "QPSK (CTC) ½ Rep6" of Table 1, QPSK (CTC) denotes a quadrature phase shift keying (QPSK) modulation scheme and a convolutional turbo code (CTC) scheme, ½ denotes a coding rate, and Rep6 denotes a number of repetitions of a repetitive code.

The agent 430 may receive a content transmission request from the dual mode terminal 500, and may request the content controller 300 for a required content, and transfer, to a user via a wireless resource, the content received from the content controller 300. In this instance, the agent 430 may select a transmission scheme for transmitting the content received from the content controller 300, and may control the first cellular module 410 to transmit the content according to the selected transmission scheme.

Specifically, when the content provided from the content controller 300 corresponds to a broadcasting content, the agent 430 may select a reliable transmission scheme (i.e., a BS or index 0 of Table 1) in order to transmit the provided content to all the terminals 500, 502, 503, and 504 within the cell. When the provided content corresponds to a non-broadcasting content, the agent 430 may adaptively select a transmission scheme based on a channel state of each of the terminals 500, 502, 503, and 504.

The agent 430 may consider a priority with respect to a plurality of transmission schemes transmitting a content. The plurality of transmission schemes may include a broadcasting scheme (BS), a switched broadcasting scheme (SBS), a switched multicast scheme (SMS), and a unicast scheme (US).

The BS denotes a scheme that may transmit a corresponding content using a most robust MCS so that all the terminals within a cell may receive the content, although no request is received from a terminal.

The SBS denotes a scheme that may transmit a corresponding content so that all the terminals within a cell may receive the content, when a content transmission request is received from a terminal.

The SMS denotes a scheme that may transmit a corresponding content to a terminal requesting the content using an optimal MCS when a content transmission request is received from the terminal, and may transmit the content to other terminals using the same MCS.

The US denotes a scheme that may transmit a corresponding content to a terminal requesting the content using an optimal MCS when a content transmission request is received from the terminal.

The agent 430 may assign a priority to each of transmission schemes for transmitting a content, and may select a transmission scheme having a relatively high priority, that is, a most reliable transmission scheme with respect to a broadcasting content having a relatively high popularity and importance. Accordingly, the agent 430 may select an MCS having a low modulation and a low coding rate with respect to the broadcasting content, and transmit the broadcasting content to the terminals 500, 502, 503, and 504 using the selected MCS.

Referring to Table 1, when an index of MCS increases, it is possible to transmit more bit information due to a high order modulation and a high coding rate. However, for this, a relatively high SNR may be required, which may result in decreasing the signal transmission distance. Since the broadcasting content may need to be transferred to all the terminals 500, 502, 503, and 504 within the cell, the agent 430 may transmit the broadcasting content using a most robust scheme, that is, an MCS with a low index.

The agent 430 may transmit a maximum N number of contents using a given wireless resource. For this, the agent 430 may provide an algorithm satisfying Equation 1.

$$\sum_{i=1}^{n_{\varphi}} \varphi_i^{cb} + \sum_{i=n_{cb}+1}^{n_{cb}+n_{sb}} \varphi_i^{sb} + \sum_{i=n_{cb}+n_{sb}+1}^{N} \varphi_i^{sm} \leq C \qquad \text{[Equation 1]}$$

Parameters used in Equation 1 and to be used herein after may be described as follows:

| Parameters | Description |
|---|---|
| $N_{cb}$ | a number of contents to be transmitted in a BS form |
| $N_{sb}$ | a number of contents to be transmitted in an SMS form |
| N | a total number of transmittable contents |
| C | denotes a portion of entire wireless resource amounts, and a value preset for a broadcasting and multicast |
| VSR (Video Service Rate) | denotes a video service rate, and a data rate required for servicing a single content |
| L | denotes a video packet length and is assumed to have a fixed length |
| L_pdu | a length obtained by adding a WiMAX protocol overhead to a video packet length L |
| L_map_ie | MAP_DATA_IE size according to a WiMAX protocol |
| BPS(MCS) | Bit per Slot, a number of pits per a slot serviced by a given MCS |
| R (VSR, MCS_pdu | denotes a resource amount required when a content having a VSR is serviced as MCS_p, and is indicated as a number of slots required per second |
| $\phi_i^{cb}$ | a service resource amount required when servicing a content having an $i^{th}$ popularity in a broadcasting form using a most robust MCS, that is, a service resource amount required when transmitting the content according to a BS transmission scheme |
| $\phi_i^{sb}$ | a resource amount required when servicing a content having an $i^{th}$ popularity in a switched broadcasting form using a most robust MCS, that is, a service resource amount required when transmitting the content according to an SBS transmission scheme |
| $\phi_i^{sm}$ | a resource amount required when servicing a content having an $i^{th}$ popularity in a switched multicast form using a most robust MCS, that is, a service resource amount required when transmitting the content according to an SMS transmission scheme |
| $\phi_i^{cu}$ | a resource amount required when servicing a content having an $i^{th}$ popularity in a unicast form using a most robust MCS, that is, a service resource amount required when transmitting the content |

-continued

| Parameters | Description |
|---|---|
| | according to a US transmission scheme |
| U | a total number of users requesting a content |
| u_j | a number of users using a $j^{th}$ MCS among users requesting a content |
| $p_i(x)$ | a probability that there is no user requesting a content having an $i^{th}$ popularity |
| $q_N(i)$ | a probability that a user may request a content having an $i^{th}$ popularity among a total N of contents (referred to as a 'Zipfian probability') |

As described above, C of Equation 1 corresponds to a portion of total wireless resource amounts. Therefore, according to an embodiment of the present invention, there may be provided a method that may provide as many contents as possible within a range not exceeding a given C.

Figure 4:
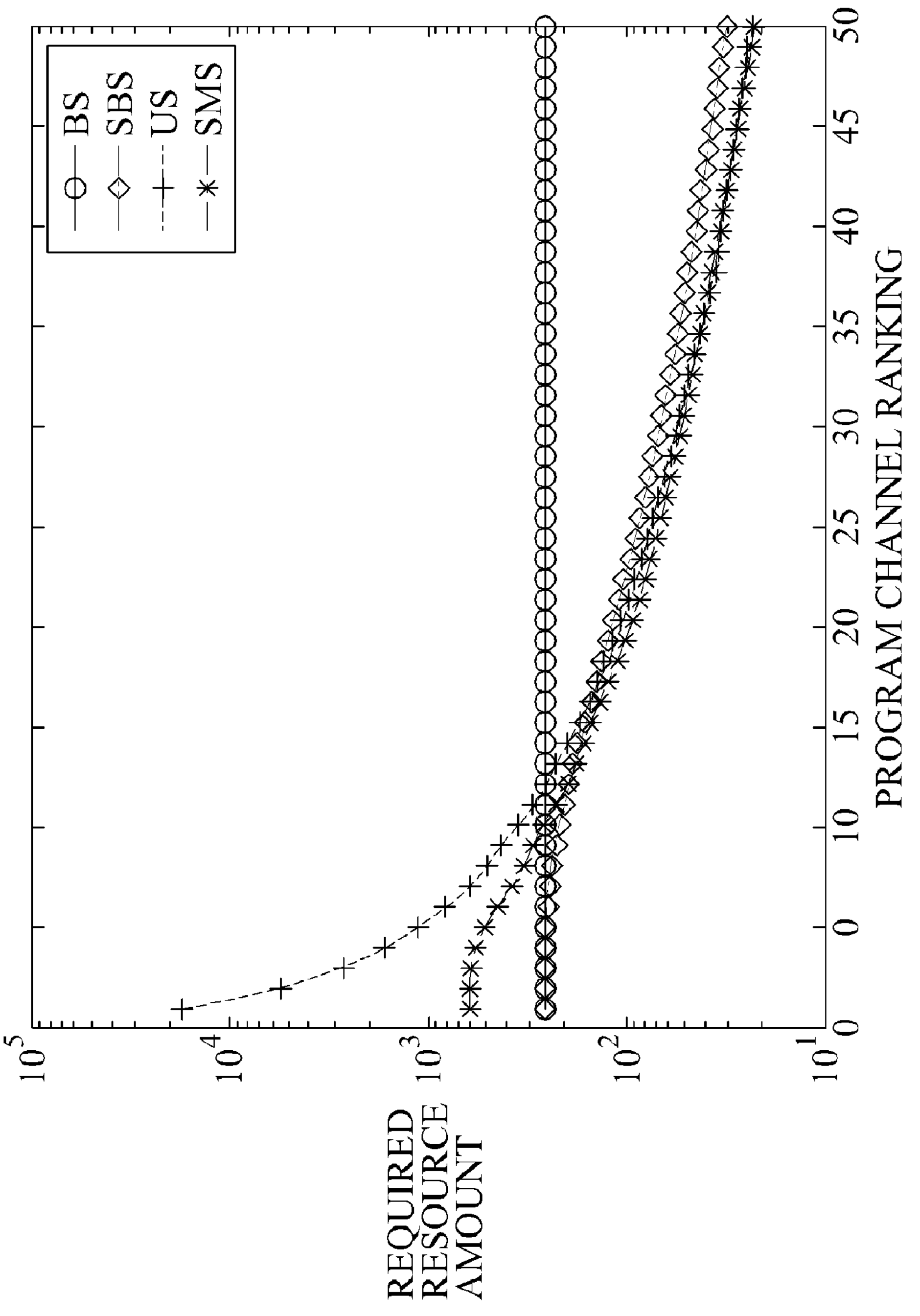
FIG. 4 is a graph illustrating a priority rank of a content, that is, a required resource amount of a program content according to a program channel rank according to an embodiment of the present invention.

FIG. 4 is a graph illustrating a priority rank of a content, that is, a required resource amount, for example, a required orthogonal frequency division multiple access (OFDMA) PUSC slot rate, of a program content according to a program channel rank according to an embodiment of the present invention. The graph of FIG. 4 shows a comparison result of resource amounts required for each popularity according to a BS, an SBS, an SMS, and a US. For example, when a first ranking program is transmitted according to the US, a largest resource amount may be required. When the first ranking program is transmitted according to the SBS or the BS, a smallest resource amount may be required.

Accordingly, to satisfy a condition of Equation 1, when sequentially providing contents in a form of the BS, the SBS, and the SMS in an order of a popularity, a maximum N of contents may be provided. For example, the maximum N of contents may be transmitted within the given wireless resource amount C by adjusting contents, that is, a number of program channels corresponding to top ranking A % to be transmitted according to the BS, by adjusting contents corresponding to intermediate ranking B % to be transmitted according to the SBS, and by adjusting contents corresponding to bottom ranking C % to be transmitted according to the SMS. Here, A %+B %+C %=100%.

A resource amount for unicast and a resource amount for each transmission scheme used in Equation 1 may be computed according to Equation 2.

[Equation 2]

$$\varphi_i^{cb} = R(VSR, M_0)$$

$$\varphi_i^{sb} = R(VSR, M_0) \times (1 - p_i(U))$$

$$\varphi_i^{sm} = \sum_{j=0}^{8} R(VSR, M_j) \cdot (1 - p_i(u_j))$$

$$\varphi_i^{cu} = \sum_{k=1}^{U} \left[ q_N(i) \times \sum_{j=0}^{8} R(VSR, M_j) \cdot Pr(MCS = M_j) \right]$$

In Equation 2, $M_0$ denotes an MCS corresponding to index 0 in Table 1, $M_i$ denotes an MCS corresponding to index i, and $M_j$ denotes an MCS corresponding to index j.

R(VSR, $MCS_{pdu}$), $u_j$, and $p_i(x)$ disclosed in Equation 2 may be determined according to Equation 3.

[Equation 3]

$$R(VSR, MCS_{pdu}) = \frac{1}{\Delta t} \cdot \left( \frac{L_{pdu}}{BPS(MCS_{pdu})} + \frac{L_{map\_ie}}{BPS(MCS_{map})} \right)$$

$$u_j = U \times Pr(MCS = M_j)$$

$$p_i(x) = (1 - q_N(i))^x$$

In this instance, a probability that any terminal may use an $i^{th}$ MCS may be computed according to Equation 4.

[Equation 4]

$$Pr\{MCS = M_i \mid 0 \le i \le 8\} = \frac{d_i^2 - d_{i+1}^2}{d_0^2},\ d_9 = 0.$$

Also, Δt may be computed as L/VSR.

Using Equation 1 through Equation 4, the agent 430 may compute N, $n_{cb}$, and $n_{sb}$ within the range not exceeding the given wireless resource amount C. Each of N, $n_{cb}$, and $n_{sb}$ may have a different optimal value depending on a number of terminals within a cell. A network designer may use an optimal value based on the number of terminals within the cell, that is, a number of users.

With respect to contents received from the content controller 300, the agent 430 may allocate a number $n_{cb}$ of contents to be transmitted according to the BS, a number $n_{sb}$ of contents to be transmitted according to the SBS, and a number of contents to be transmitted according to the SMS, based on a popularity ranking and an importance ranking of each corresponding content. A total number of contents may be equal to the total number N of contents transmittable by the agent 430.

Specifically, when N, $n_{cb}$, and $n_{sb}$ are determined, the agent 430 may consider a ranking computed based on a popularity and an importance of a corresponding content to thereby allocate a number of contents corresponding to $n_{cb}$ to the BS transmission scheme, allocate a number of contents corresponding to $n_{sb}$ to the SBS transmission scheme, and allocate remaining contents to the SMS transmission scheme. In addition, in the case of exceeding the given wireless resource amount C, when a total wireless resource amount allows, the agent 430 may enable a content of a particular channel to be transmitted according to the US transmissions scheme. Specifically, when a wireless resource allows, the particular content exceeding the number N of contents that may be provided within the given wireless resource amount C may be transmitted according to the US transmission scheme. Conversely, when the wireless resource does not allow, a request of a corresponding terminal may be rejected.

Referring again to FIG. 3, the dual mode terminal 500 and the signal mode terminals 502, 503, and 504 may request the agent 430 of the base station 400 for a content through the cellular communication, and may receive the requested content from the base station 400. The dual mode terminal 500 may transmit the received content to the short-range terminal 600 through a wideband short-range communication. For this, the dual mode terminal 500 may include a second cellular module 510, a content client 520, a signal processor 530, a short-range communication module 540, and a cradle interface unit 550.

The second cellular module 510 may request the base station for transmission of a content through the cellular communication, and may receive, from the base station 400, the requested content and a broadcasting content having a relatively high popularity. The received content AV may be compressed and be encoded.

The content client 520 enables a user to select a program content through a program content search. The content client 520 may determine whether a program selected by the use is currently being serviced. When the program is not being serviced, the content client 520 may control the second cellular module 510 to request the agent 430 for a content of the selected program. Also, the content client 520 may display the content provided from the base station 400. For this, the content client 520 may include a display panel such as a liquid crystal display (LCD) panel, a touch panel, and the like.

The signal processor 530 may decompress the received content and also decode the decompressed content. The signal processor 530 may perform signal processing of the decoded content AV into a form that may be transmittable to the short-range terminal 600.

The short-range communication module 540 may transmit, to the short-range terminal 600 using a wideband, the content AV' output from the signal processor 530. The short-range communication module 540 may transmit the content at ultra speed via a 60 GHz communication module using a frequency band of 60 GHz or via a module using the wideband.

The dual mode terminal 500 may be movable within the cellular communication network. Therefore, when the short-range terminal 600 including the 60 GHz communication module is present in the cellular communication network, the dual mode terminal 500 may provide a high quality content to the short-range terminal 600. However, the dual mode terminal 500 may frequently operate based on only a battery instead of a fixed power and thus may need to effectively use a battery power. For this, according to an embodiment of the present invention, it is possible to enhance a power efficiency of the short-range communication module 540 by adaptively adjusting a frequency bandwidth, and a number of power amplifiers (PAs) and a number of low noise amplifiers (LNAs) of a radio frequency (RF) module 541 of FIG. 6.

Figure 5:
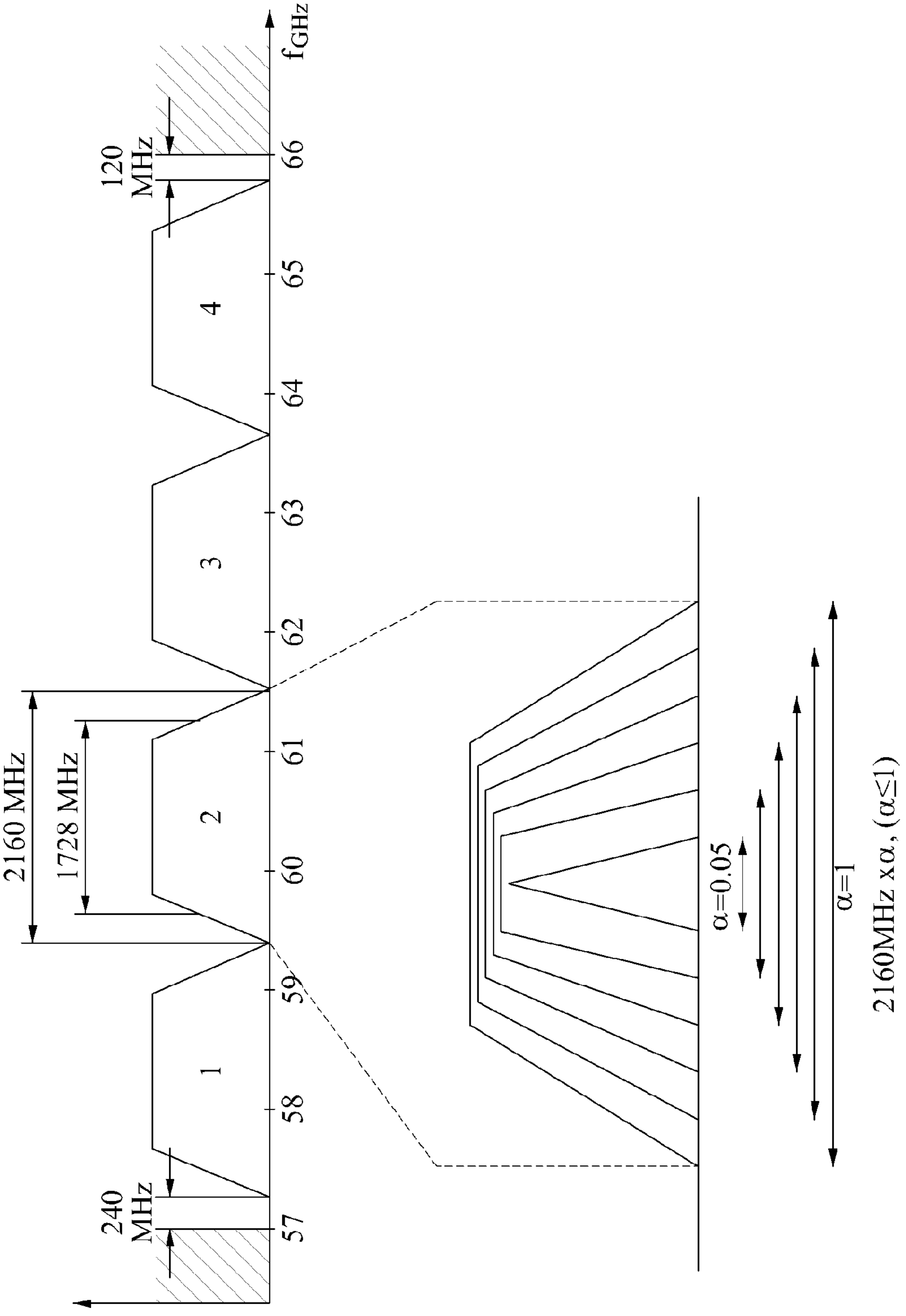
FIG. 5 is a diagram to describe channels of 60 GHz frequency band and a scalable channelization scheme according to an embodiment of the present invention.

FIG. 5 is a diagram to describe channels of 60 GHz frequency band and a scalable channelization scheme according to an embodiment of the present invention. Generally, the 60 GHz frequency band may include a 2.16 GHz bandwidth as a unit channel, and four channels may be globally allocated. When a channel bandwidth is wide, a power consumption may increase. Therefore, according to an embodiment of the present invention, the channel bandwidth may adaptively vary and thereby be used according to Equation 5.

$$BW = 2160\ \text{MHz} \times \alpha\ (0.05 \leqq \alpha \leqq 1) \quad \text{[Equation 5]}$$

Referring to Equation 5, BW denotes a frequency bandwidth of a channel, and α denotes a parameter value that may be determined through a cooperation between 60 GHz communication modules, that is, through a communication between the short-range communication module 540 and a communication module 610. When α=1, the short-range communication module 540 may use a basic channel bandwidth. When α=0.05, the short-range communication module 540 may use a minimum channel bandwidth. Here, 0.05 is only an example and thus the present invention is not limited thereto.

Figure 6:
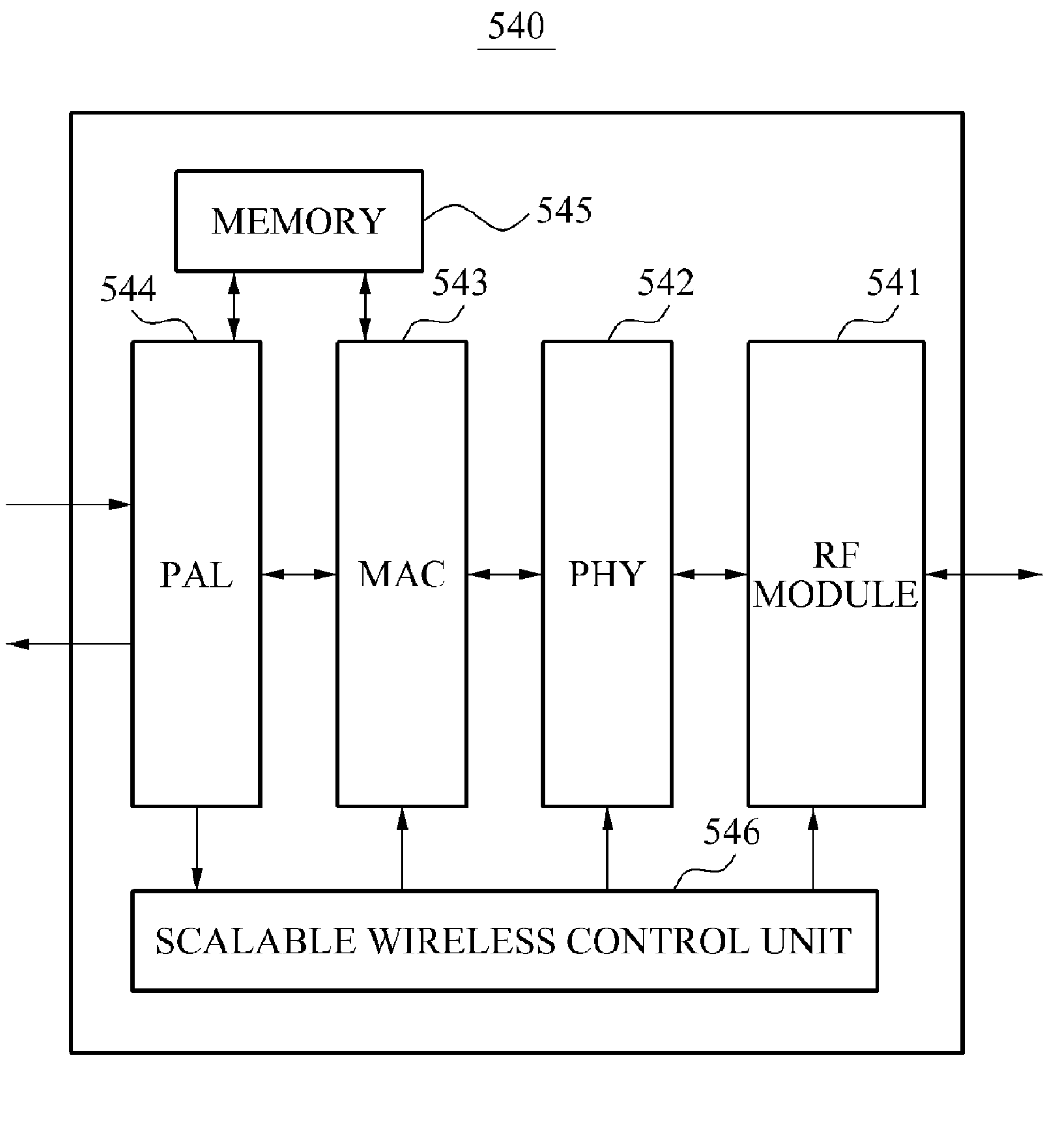
FIG. 6 is a block diagram illustrating a short-range communication module according to an embodiment of the present invention.

FIG. 6 is a block diagram illustrating a short-range communication module 540 according to an embodiment of the present invention.

Referring to FIG. 6, the short-range communication module 540 may include the RF module 541, a physical layer (PHY) 542, a Media Access Control (MAC) 543, a Protocol Adaptation Layer (PAL) 544, a memory 545, and a scalable wireless control unit 546. The RF module 541, the PHY 542, the MAC 543, and the PAL 544 may be blocks for, for example, 60 GHz communication.

Figure 7:
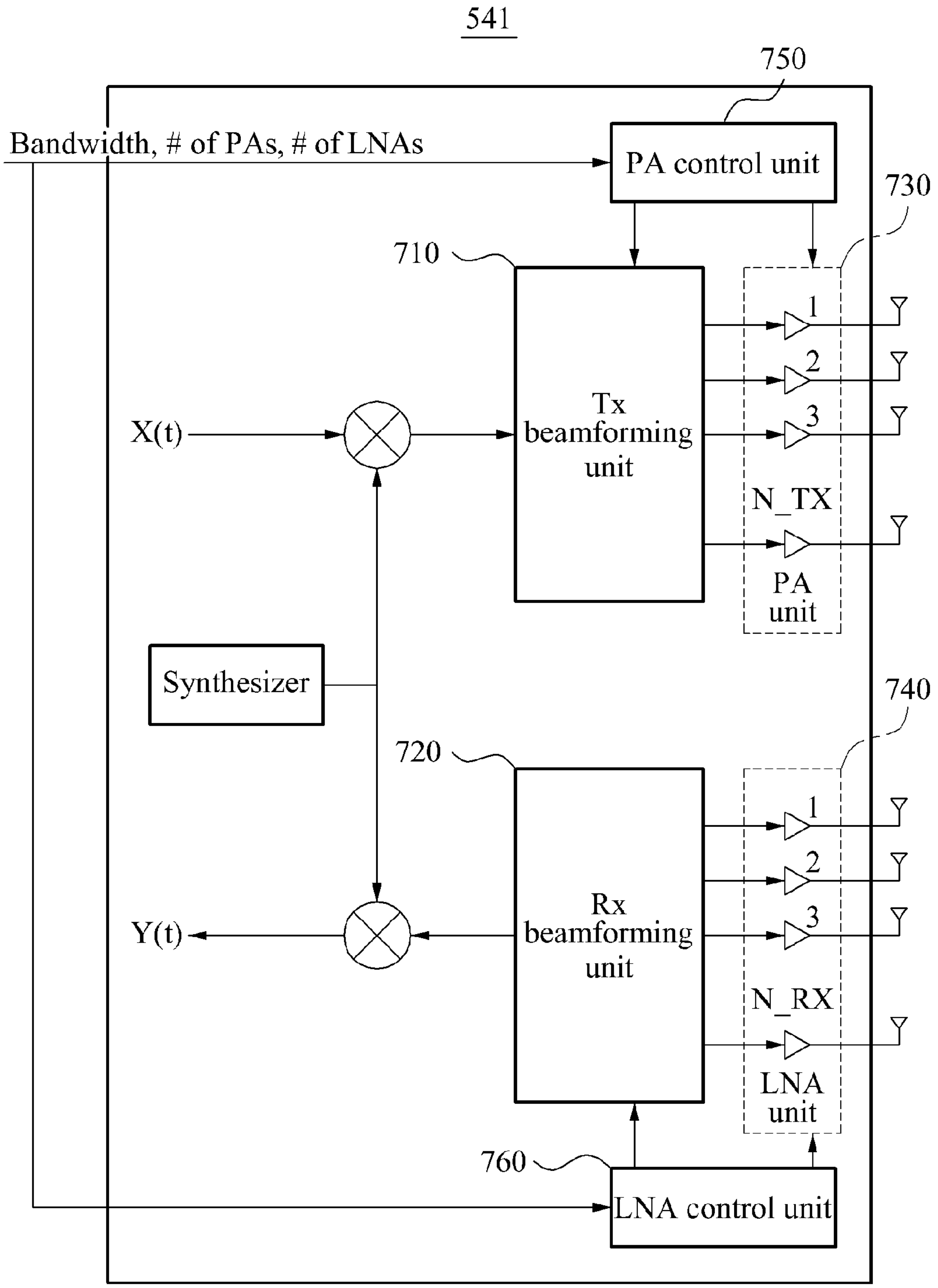
FIG. 7 is a block diagram illustrating a radio frequency (RF) module of FIG. 6.

The RF module 541 may perform beamforming of a transmission signal and a received signal to effectively use an RF of 60 GHz. As shown in FIG. 7, the RF module 541 may include a PA unit 730 including a plurality of PAs and a LAN unit 740 including a plurality of LANs.

The PHY 542 may perform functions of modulating and demodulating a channel, and encoding and decoding the channel. The MAC 543 may perform functions of generating, receiving, and scheduling a packet.

The PAL 544 may connect a non-compressed content, for example, a WSDV content to the communication module 610 of the short-range terminal 600.

The memory 545 may store the generated packet, the received packet, scheduled information, and the like.

The scalable wireless control unit 546 may adaptively change a channel bandwidth of a wideband and thereby determine a frequency band to be used for a communication with the short-range terminal 600, and may also determine the number of PAs and the number of LANs to be used for the communication. The scalable wireless control unit 546 may change the channel bandwidth of the wideband based on a transmission rate of data transmitted and received via the short-range communication module 540 and a power of the dual mode terminal 500, and thereby determine the number of PAs and the number of LANs. For example, the scalable wireless control unit 546 may decrease the bandwidth by decreasing "α" as a data rate is lower and a battery charge amount is smaller, and may set the number of PAs included in the PA unit 730 and the number of LANs included in the LAN unit 740 to be small.

FIG. 7 is a block diagram illustrating the RF module 541 of FIG. 6.

The RF module 541 may adjust a frequency bandwidth, and a number of PAs and a number of LANs to be used by means of the scalable wireless radio unit 546. In general, a Tx beamforming unit 710 and an Rx beamforming unit 720 of the RF module 541 of 60 GHz may enhance a signal propagation efficiency by performing beamforming and beam steering using a plurality of antennas. In FIG. 7, a number of transmit antennas is N_TX and a number of receive antennas is N_RX, and N_TX=N_RX depending on embodiments. Also, without configuring the transmit antenna and the receive antenna, transmission and reception may be performed through temporal division. For beamforming and beam steering, a PA and an LNA corresponding to the transmit antenna and the receive antenna may be required. Accordingly, a number of PAs may be N_TX and a number of LNAs may be N_RX.

The scalable wireless control unit 546 may adjust the frequency band width, the number of PAs, and the number of LANs based on a data rate and a battery state of the dual mode terminal 500. A PA control unit 750 and an LNA control unit 760 may turn on the determined number of PAs and LNAs, and turn off remaining PAs and LNAs, and thereby adjust the number of PAs and LNAs to be used.

As described above, it is possible to effectively use a battery power of the dual mode terminal 500 by adjusting the bandwidth of the wideband, the number of PAs, and the number of LANs to be used.

Figure 8:
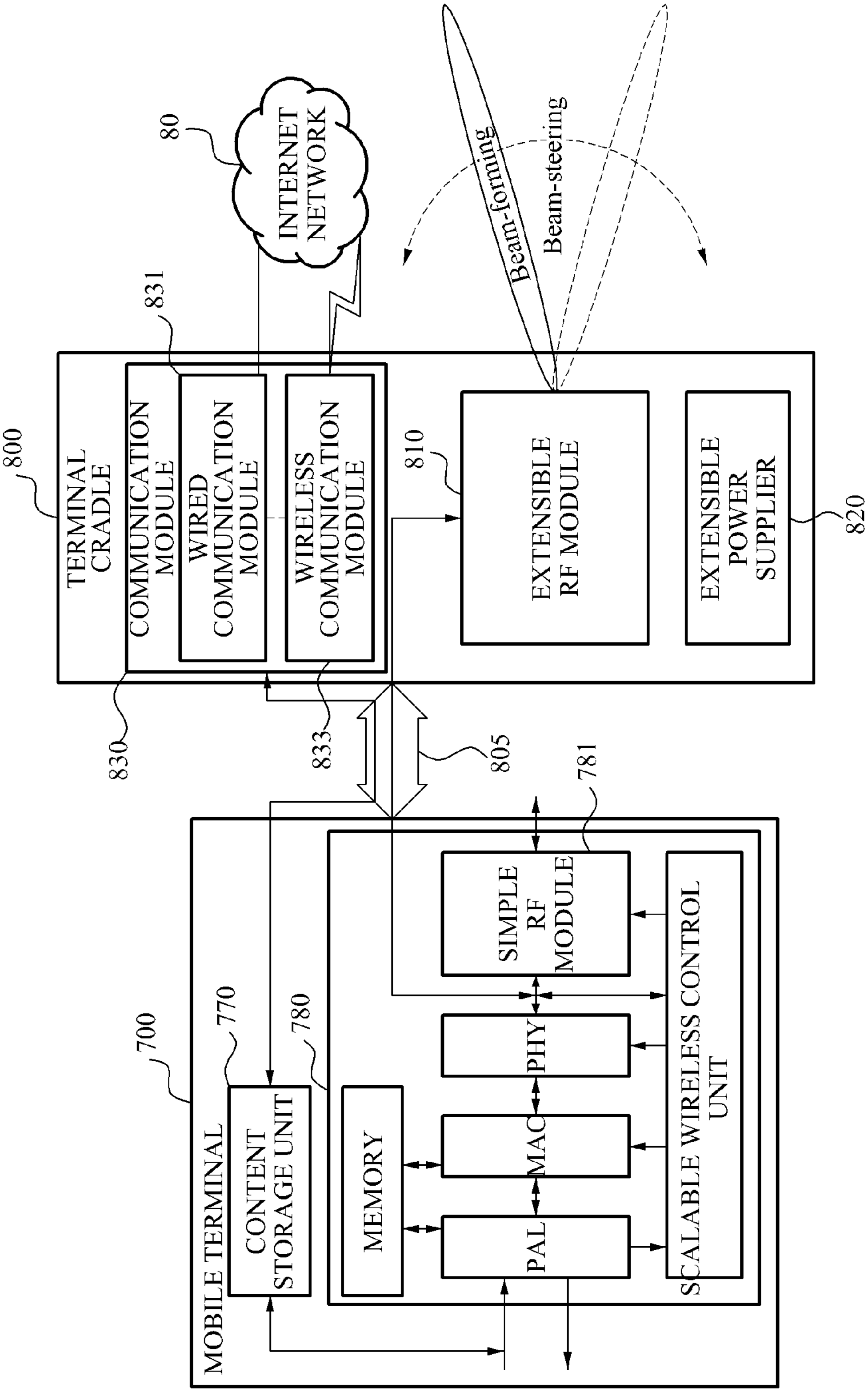
FIG. 8 is a block diagram illustrating an RF module and a cradle according to another embodiment of the present invention.

Referring again to FIG. 3, the cradle interface unit 550 of the dual mode terminal 500 may provide an electrical interface between the dual mode terminal 500 and a terminal cradle 800 of FIG. 8. The terminal cradle 800 denotes a device used by the dual mode terminal 500, and the cradle interface unit 550 may be selectively provided in the dual mode terminal 500.

As shown in FIG. 8, the terminal cradle 800 may include an extensible RF module 810 including a plurality of PAs and a plurality of LNAs, and an extensible power supplier 820. When the dual mode terminal 500 electrically connects with the terminal cradle 800 via the cradle interface unit 550, the short-range communication module 540 may perform beamforming of a signal using the extensible RF module 810, and may receive a fixed power from the extensible power supplier 820.

FIG. 8 is a block diagram illustrating an RF module and a cradle according to another embodiment of the present invention.

Referring to FIG. 8, a mobile terminal 700 may include a simple RF module 781 due to a limited power use. The mobile terminal 700 may be connected to the terminal cradle 800 including the extensible RF module 810 and the extensible power supplier 820. Accordingly, the mobile terminal 700 may enhance a quality of wireless communication by employing a function of the extensible RF module 810 without a limit on the power use.

Generally, a mobile terminal may use a battery and thus have some constraints on the power use. In particular, for excellent wireless communication, an RF module of 60 GHz band may use a plurality of antennas, PAs, and LNAs as shown in FIG. 5, and thus may consume a large amount of power. To solve the above problem, the mobile terminal 700 may include a content storage unit 770 and a short-range communication module 780.

The content storage unit 710 may store a content provided from the content controller 300 through a cellular communication, or may store a content provided from a communication module 830 of the terminal cradle 800 through a short-range communication.

The short-range communication module 780 may be similar to the short-range communication module 540 described above with reference to FIGS. 6 and 7, and thus further description related thereto will be omitted here. The short-range communication module 780 may decrease a number of transmit antennas and a number of receive antennas, whereby the simple RF module 781 including a decreased number of PAs and a number of LNAs may be mounted and thereby a power consumed in the simple RF module 781 may decrease.

Due to the simple RF module 781, a communication distance may decrease and depending on cases, a user may need to directly adjust an antenna direction. Accordingly, to complement the above situation, the terminal cradle 800 may be used. Specifically, the extensible RF module 810 may be added to the terminal cradle 800 capable of using an extended battery or a fixed power, and the mobile terminal 700 may be connected to the terminal cradle 800. Through the above connection, it is possible to combine the simple RF module 781 of the mobile terminal 700 and the extensible RF module 810 of the terminal cradle 800, or to use the simple RF module 721 instead of the extensible RF module 810.

For this, the terminal cradle 800 may include a cradle interface unit 805, the extensible RF module 810, the extensible power supplier 820, and the communication module 830.

The cradle interface unit 805 may be mounted to the dual mode terminal 700 to provide an electrical interface.

Similarly to FIG. 7, the extensible RF module 810 may perform beamforming and beam steering of a signal using a plurality of antennas, (not shown), a plurality of PAs (not shown), and a plurality of LNAs (not shown). In particular, the extensible RF module 810 may form a beam with a relatively narrow width using the plurality of antennas, the plurality of PAs, and the plurality of LNAs, and may provide precise beam steering through PA and LNA parameter adjustment, and may also provide a long-range communication and an optimal communication quality.

Since the extensible power supplier 820 may include an extended battery or provide a fixed power, the mobile terminal 700 or the terminal cradle 800 may use the extensible RF module 810 without a limit on a power use.

The communication module 830 may communicably connect the mobile terminal 700 with other peripheral devices, and for this, may include a wired communication module 831 and a wireless communication module 833. The wired communication module 831 and the wireless communication module 833 may receive a content from an Internet network 80 through a wired and wireless communication to transmit the received content to the mobile terminal 700 via the cradle interface unit 805, and to transmit the content stored in the mobile terminal 700 to peripheral devices. For example, the peripheral device may include the short-range terminal 600 that may perform a short-range communication with the mobile terminal 700.

Referring again to FIG. 3, the short-range terminal 600 may include a communication module 610 and a display unit 620.

The communication module 610 may perform a wideband short-range communication with the dual mode terminal 500. The communication module 610 may include an RF module (not shown) in a similar form to FIGS. 5 and 6, and may receive the content AV' via a predetermined frequency band.

The display unit 620 may display the received content AV'. The content AV' may be received at high speed via the wideband frequency and thus be displayed in a high quality.

Figure 9:
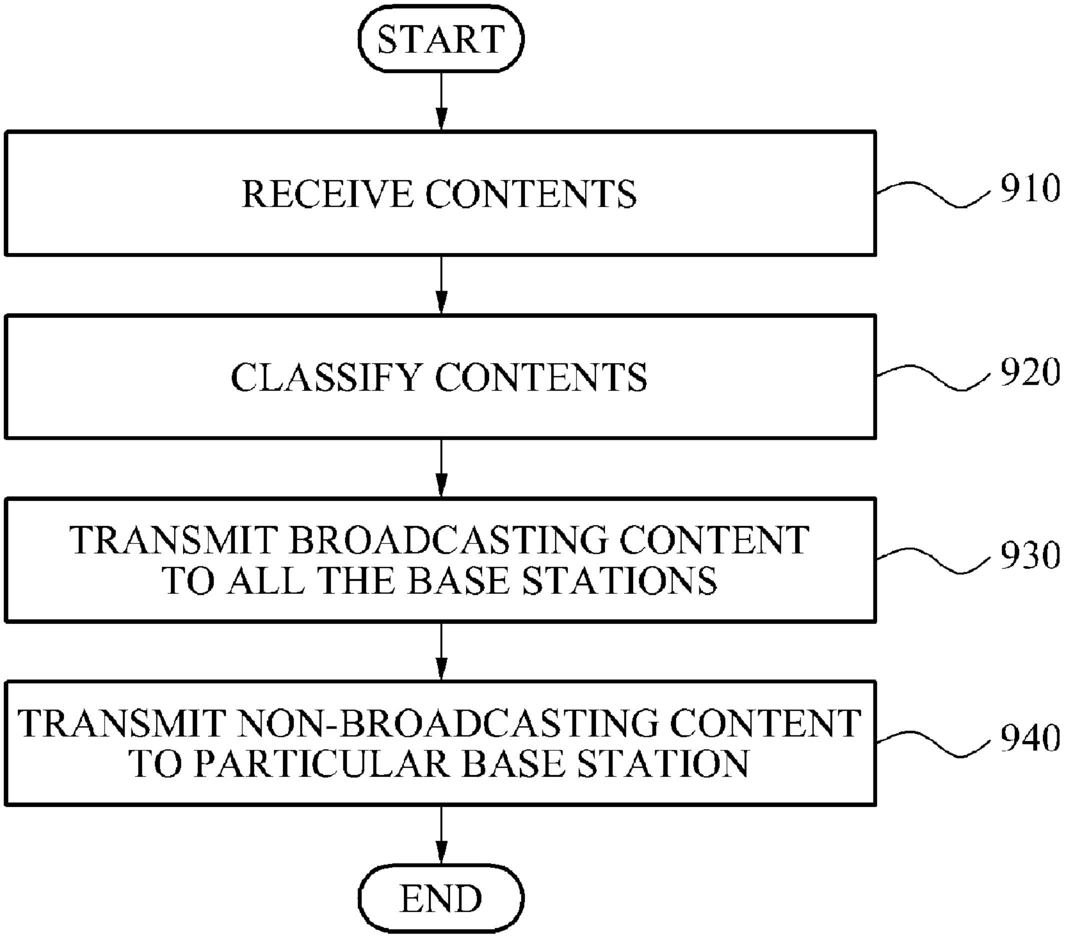
FIG. 9 is a flowchart illustrating a content transmission method of a content controller according to an embodiment of the present invention.

FIG. 9 is a flowchart illustrating a content transmission method of the content controller 300 according to an embodiment of the present invention.

In operation 910, the content recognition communication unit 320 may receive contents over the content server 100 and the core network 200.

In operation 920, the content manager 310 may classify the received contents into a broadcasting content and a non-broadcasting content. In operation 920, the content manager 310 may sort contents based on a popularity and an importance, and may select a content having a relatively high popularity and importance as the broadcasting content.

In operation 930, the content manager 310 may control the content recognition communication unit 320 to transmit the broadcasting content to all the base stations.

In operation 940, when a request is received from a base station, the content manager 310 may control the content recognition communication unit 320 to transmit the non-broadcasting content to the corresponding base station. Specifically, when a particular base station requests a transmission of a particular content, the content manager 310 may control the content recognition communication unit 320 to select the particular content from non-broadcasting contents, and to transmit the particular content to the particular base station.

Figure 10:
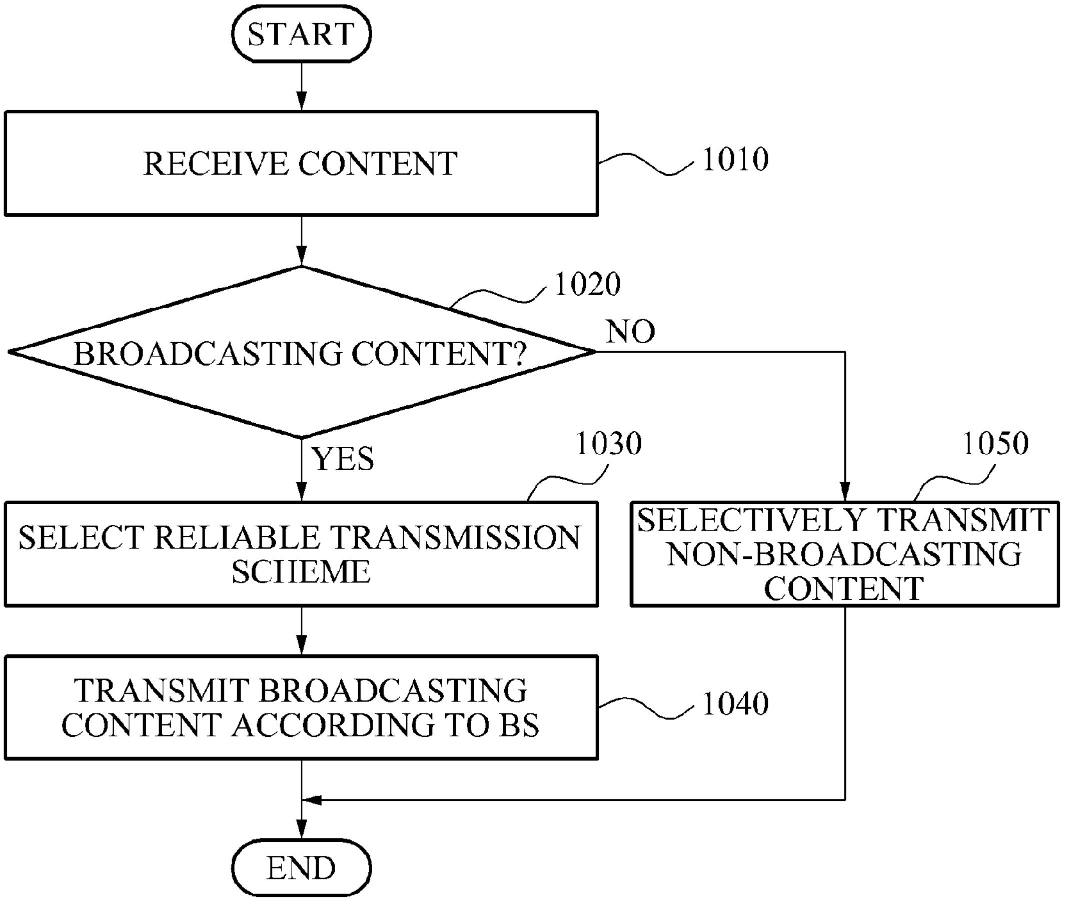
FIG. 10 is a flowchart illustrating a content transmission method of a base station according to an embodiment of the present invention.

FIG. 10 is a flowchart illustrating a content transmission method of the base station 400 according to an embodiment of the present invention.

In operation 1010, the first cellular module 410 may receive a content from the content controller 300.

When the received content corresponds to a broadcasting content having a relatively high popularity and importance in operation 1020, the agent 430 may select a transmission scheme for transmitting the received content to all the terminals within a cell in operation 1030. The selected transmission scheme may correspond to a most reliable transmission scheme and thus may be an MCS of which an index is "0".

In operation 1040, the first cellular module 410 may transmit the broadcasting content to all the terminals within the cell according to the selected transmission scheme (MCS having index 0) in a BS form. The MCS of which the index is "0" may correspond to an MCS having a low modulation and a low coding rate and thus may be used to transmit a content to a long-range terminal.

Conversely, when the received content does not correspond to the broadcasting content, that is, corresponds to a non-broadcasting content, and is received by a request from any one of the terminals in operation 1020, the agent 430 may transmit the content adaptively and selectively based on a channel state of each terminal and a ranking of the received content. When the ranking of the received content corresponds to, for example, a ranking to be transmitted in an SMS form, the agent 430 may select, for each terminal, one of transmission schemes disclosed in Table 1 based on the channel state of each terminal.

Figure 11:
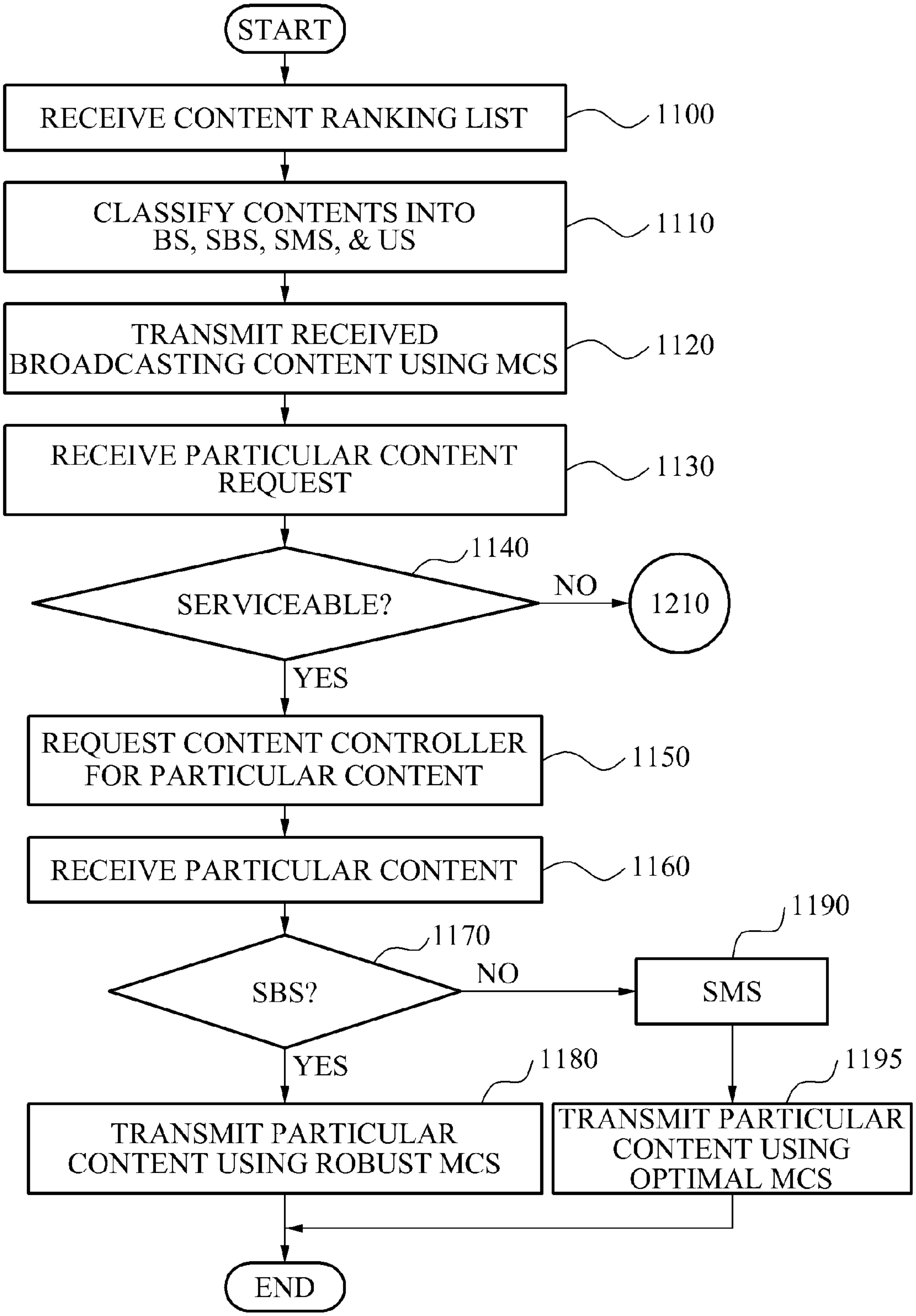
FIGS. 11 and 12 are flowcharts illustrating in detail the content transmission method of the base station of FIG. 10.
Figure 12:
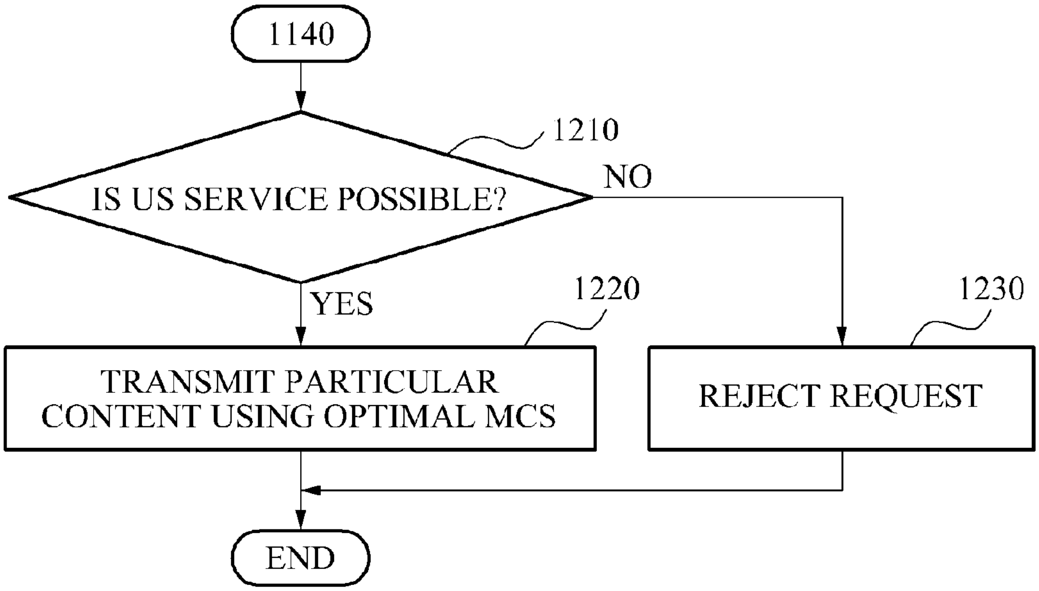

FIGS. 11 and 12 are flowcharts illustrating in detail the content transmission method of the base station 400 of FIG. 10.

Referring to FIG. 11, in operation 1100, the first cellular module 410 may receive a content ranking list from the content controller 300.

In operation 1110, the agent 430 may classify a transmission scheme of the content into a BS, an SBS, an SMS, and a US based on the content ranking list. The agent 430 may perform operation 1110 using N, $n_{cb}$, and $n_{sb}$ that are obtained according to Equation 1 through Equation 4.

In operation 1120, the first cellular module 410 may transmit the broadcasting content provided from the content controller 300, to all the terminals within a cell according to a most robust MCS. The broadcasting content belongs to the BS form and thus the first cellular module 410 may transmit the broadcasting content to all the terminals using a wireless section.

In operation 1130, a request for a particular content may be received from a particular terminal, for example, the terminal 502. In operation 1140, the agent 430 may determine whether the particular content is serviceable. When identification information of the particular content is included in the content ranking list, the agent 430 may determine the particular content is serviceable, for example, corresponds to a WSDV service.

In operation 1150, the first cellular module 410 may request the content controller 300 for transmission of the particular content through a cellular communication.

In operation 1160, the first cellular module 410 may receive the particular content from the content controller.

When a transmission scheme corresponding to a ranking of the particular content is verified as the SBS form in operation 1170, the agent 430 may transmit the particular content to all the terminals using a robust MCS and the wireless section in operation 1180.

Conversely, when the transmission scheme corresponding to the ranking of the particular content is verified as the SMS form in operation 1190, the agent 430 may transmit the particular content to the terminal 502 using an optimal MCS and the wireless section in operation 1195. The optimal MCS may be selected based on a state of the terminal 502. Also, the transmitted content may be received by the terminal 502 and by other terminals.

When the particular content is not serviceable in operation 1140, the agent 430 may determine whether a US service of the particular content is possible in operation 1210.

When the US service is determined to be possible in operation 1210, the agent 430 may transmit the particular content to only the corresponding terminal 502 using an optimal MCS and the wireless section in operation 1220. This is because the particular content exceeding a number of contents that may be provided within a given wireless resource amount C may be transmitted according to a US transmission scheme as far as a total wireless resource allows.

Conversely, when the US service is determined to be impossible in operation 1210, the agent 430 may reject a transmission request of the content in operation 1230.

Figure 13:
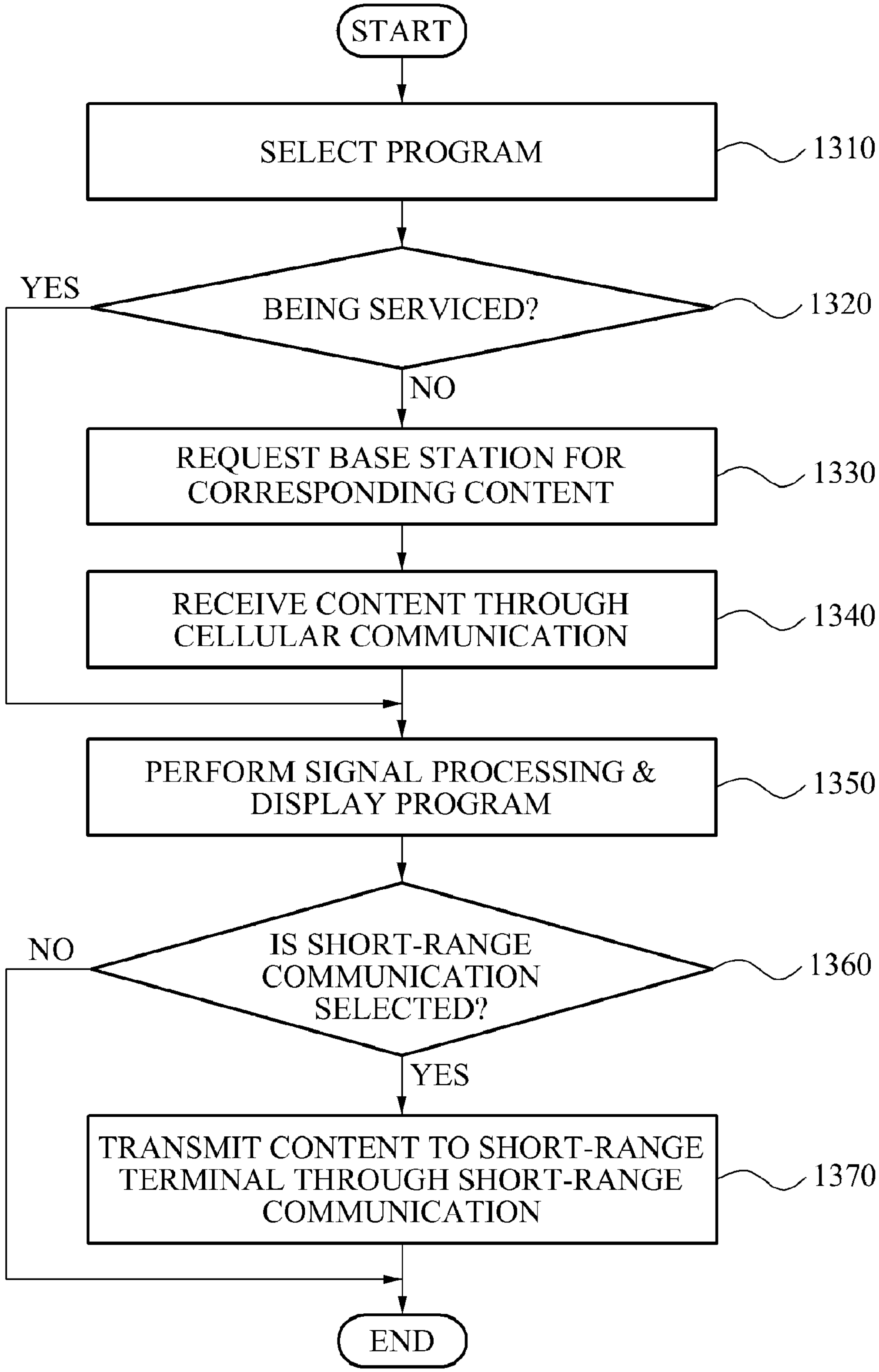
FIG. 13 is a flowchart illustrating a content transmission method of a dual mode terminal according to an embodiment of the present invention.

FIG. 13 is a flowchart illustrating a content transmission method of the dual mode terminal 500 according to an embodiment of the present invention.

In operation 1310, a program to be viewed may be retrieved and be selected by the content client 520.

When the selected program is not being serviced in operation 1320, the second cellular module 510 may request the base station 400 for a content of the program in operation 1330. The second cellular module 510 may request the content through a cellular communication using a wireless section.

In operation 1340, the second cellular module 510 may receive the content through the cellular communication.

In operation 1350, the signal processor 530 may process the received content in a displayable form by decompressing and decoding the received content. The processed content may be displayed on a display panel of the dual mode terminal 500.

When a short-range communication is selected to transmit the processed content to the short-range terminal 600 in operation 1360, the short-range communication module 540 may transmit the decompressed content to the short-range terminal 600 through a wideband-based communication. In this instance, the short-range communication module 540 may determine a number of PAs and a number of LANs to be used in the RF module 541, based on a data rate and a power of the dual mode terminal 500, and may transmit the decompressed content by changing a channel bandwidth of a wideband.

According to an embodiment of the present invention, it is possible to provide a multimedia service in interoperation with a cellular communication and a wideband short-range wireless communication. A cellular wireless network resource may be effectively used by effectively providing a compressed multimedia service using the cellular communication. Also, the multimedia service may be provided to a short-range terminal using the wideband short-range wireless communication.

Also, according to an embodiment of the present invention, when a multimedia service is provided to a short-range terminal, it is possible to transmit the multimedia service using a wideband frequency by decompressing a compressed multimedia stream. Accordingly, the short-range terminal may receive a high quality image.

Also, according to an embodiment of the present invention, it is possible to provide a multimedia service to a short-range terminal at high speed by using a wideband frequency.

Also, according to an embodiment of the present invention, in a UWB short-range wireless system, a power consumption may be reduced by adaptively changing a frequency bandwidth, and a number of PAs and a number of LNAs for a multiple antenna Tx/Rx according to a traffic characteristic and a data rate required by an application service for a power efficiency.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A dual mode terminal, comprising:

a cellular module configured to receive a content from a base station through cellular communication;

a signal processor configured to process the received content; and a short-range communication module configured to dynamically select a frequency band and a subset of hardware resources thereof in accordance with a data rate of the processed content, and to transmit the processed content to a short-range terminal using the selected hardware resources and the selected frequency band.

2. The dual mode terminal of claim 1, wherein the hardware resources of the short-range communication module include a radio frequency (RF) unit that has a plurality of power amplifiers and a plurality of low noise amplifiers; and the short-range communication module includes a scalable wireless control unit configured to determine, in accordance with the data rate, the frequency band, and the subset of hardware resources including a first number of the plurality of power amplifiers, and a second number of the plurality of low noise amplifiers.

3. A dual mode terminal, comprising:

a cellular module to receive a content from a base station through a cellular communication;

a signal processor to release compression of the received content, and to output the content; and a short-range communication module to transmit the output content to a short-range terminal using a wideband, the short-range communication module comprising:

a radio frequency (RF) unit comprising a plurality of power amplifiers and a plurality of low noise amplifiers; and a scalable wireless control unit to determine a frequency band, a number of power amplifiers, and a number of low noise amplifiers to be used for a communication with the short-range terminal by adaptively changing a channel bandwidth of the wideband, wherein the scalable wireless control unit changes the channel bandwidth and determines the number of power amplifiers and the number of low noise amplifiers based on a data rate and a power.

4. A dual mode terminal, comprising:

a cellular module to receive a content from a base station through a cellular communication;

a signal processor to release compression of the received content, and to output the content;

a short-range communication module to transmit the output content to a short-range terminal using a wideband; and a cradle interface unit to provide interfacing with a cradle comprising an extensible RF module and an extensible power, the extensible RF module comprising a plurality of power amplifiers and a plurality of low noise amplifiers, wherein the short-range communication module performs beamforming using the extensible RF module of the cradle, and receives a fixed power from the extensible power.

5. A content transmission method of a dual mode terminal, the method comprising:

receiving a content from a base station through cellular communication;

processing the received content;

dynamically selecting a frequency band and a subset of hardware resources of the dual mode terminal in accordance with a data rate of the processed content; and transmitting the processed content to a short-range terminal using the selected hardware resources and the selected frequency band.

6. The method of claim 5, wherein the selecting comprises determining a number of power amplifiers and a number of low noise amplifiers used in an RF module, and the frequency band, in accordance with both the data rate and available power.

* * * * *